United States Patent [19]

Kronsbein

[11] 4,350,592

[45] Sep. 21, 1982

[54] CARTRIDGE FILTER

[76] Inventor: Dirk G. Kronsbein, Heinrich-Heine Allee 3, 4000 Duesseldorf, Fed. Rep. of Germany

[21] Appl. No.: 136,085

[22] Filed: Apr. 10, 1980

[30] Foreign Application Priority Data

Apr. 19, 1979 [DE] Fed. Rep. of Germany ....... 2915730

[51] Int. Cl.³ ...................... B01D 27/08; B01D 46/02
[52] U.S. Cl. ................................. 210/450; 210/491;
55/486; 55/502; 55/505; 55/510
[58] Field of Search ................ 55/486, 487, 500, 502,
55/505, 510, 485; 210/445, 450, 451, 454, 455, 459, 477, 491, 489

[56] References Cited

U.S. PATENT DOCUMENTS

| | | | |
|---|---|---|---|
| 3,870,490 | 3/1975 | Landy | 55/502 |
| 4,074,985 | 2/1978 | Willas | 55/502 |
| 4,102,785 | 7/1978 | Head et al. | 55/487 |
| 4,104,170 | 8/1978 | Nedza | 210/491 |
| 4,231,768 | 11/1980 | Seibert et al. | 55/487 |

FOREIGN PATENT DOCUMENTS

| | | | |
|---|---|---|---|
| 2255933 | 7/1975 | France | 55/510 |
| 709897 | 6/1954 | United Kingdom . | |
| 756336 | 9/1956 | United Kingdom . | |
| 794372 | 4/1958 | United Kingdom . | |
| 816520 | 7/1959 | United Kingdom . | |
| 880537 | 10/1961 | United Kingdom . | |
| 907747 | 10/1962 | United Kingdom . | |
| 909894 | 11/1962 | United Kingdom | 55/486 |
| 988692 | 4/1965 | United Kingdom | 55/486 |
| 1018379 | 1/1966 | United Kingdom | 55/486 |
| 1382320 | 1/1975 | United Kingdom . | |
| 1437004 | 5/1976 | United Kingdom . | |
| 1518097 | 7/1978 | United Kingdom | 55/487 |

Primary Examiner—David L. Lacey
Attorney, Agent, or Firm—Toren, McGeady & Stanger

[57] ABSTRACT

A cartridge filter for gases and liquids having a filter element clamped between an upper and lower cover. The filter includes a profile ring composed of a sealing compound which is firmly connected to the upper end face and an identical and corresponding profile ring firmly connected to the lower end face of the filter element. Sealing rings are embedded in the profile rings. The covers each includes one circumferential groove engaging around the sealing rings in a claw-like manner.

6 Claims, 4 Drawing Figures

CARTRIDGE FILTER

FIELD OF THE INVENTION

This invention relates to a cartridge filter for gases and liquids, comprising a filter element clamped between an upper and a lower cover.

BACKGROUND OF THE INVENTION

A filter is described in the German Auslegeschrift DE-AS No. 25 06 359, having a bomb-shaped (i.e., closed and rounded at one end) filter housing, which is attached by means of a collar piece to an inlet and outlet head comprising an inlet duct and an outlet duct. A filter element is screwed into the head component by means of a threaded component. The threaded component possesses windows, which form a communication between the inlet duct and the internal space of the threaded component and filter cartridge. A further end cap is connected to the threaded component by means of a tension rod. The inlet and outlet head is sealed from the threaded component by an annular seal and also from the filter housing by an annular seal.

In filters of this type, the filter medium becomes dirty and must either be cleaned or replaced by a new filter medium. For filter media that can be cleaned, cleaning cannot be repeated an unlimited number of times, so that such filter media also must be replaced after a certain time. Depending upon the particular form of construction, the entire filter must be changed.

A filter is described in German Offenlegungshcrift DE-OS No. 27 06 017; wherein a hollow cylindrical filter element extends between an upper and a lower cover. The upper cover is furnished with a central opening, which is shaped to form an external thread extending coaxially to the hollow cylinder. A sealing ring situated between the upper cover and the external thread ensures that the region in which the medium to be filtered is situated is sealingly separated from the region in which the purified medium is situated.

In this filter, the upper and lower covers are firmly connected to the filter element, so that what was stated above in regard to the filter described in DE-AS No. 25 06 359 applies here also, to the effect that after a specific degree of fouling has been reached, the filter in total must be removed and replaced by a new filter. This is laborious and increases the costs to the operator.

The task underlying the present invention is to create a filter, in which the separate filter components can be separated without difficulty from one another and the fouled filter element can be replaced by a new one in a simple manner. This task is achieved according to the present invention in that a sealing ring is situated each on the upper and the lower end face of the filter element.

According to a further feature of the invention, the sealing rings are firmly connected to the filter element. It is to be recommended here that the sealing rings shall be embedded in a grouting compound, for example epoxy resin. The sealing rings should lie in grooves, the side walls of which grip around the rings in the manner of claws. The sealing rings therefore do not develop any springing action during pulling out. With attendant advantage, the epoxy resin forms a profile ring in the region of the sealing rings in such a manner that the two end regions of the filter tube fit with only slight tolerance into the grooves of the upper and lower cover. The cover may be formed as an adapter for a filter housing or may be a component of the filter housing. In the filter of this invention, the metal end caps are omitted in favour of the epoxy ring.

In this manner, a filter element is obtained, which can be removed without difficulty after a specific degree of fouling has been reached and replaced by a new one. It is therefore a throw-away component. If the sealing rings are firmly connected to the filter tube, then there is no risk of a sealing ring being forgotten in the assembly or insertion of a new filter tube.

In the filter of this invention, the covers and the tension rod are retained, which leads to lower operating costs.

SUMMARY OF THE INVENTION

The filter element can consist of two coaxial supporting cylinders with passage openings, between which a filter medium consisting of a number of layers of different porosity is situated. The outer layers preferably serve as a prefilter layer and a layer situated between them as a main filter layer.

The filter medium is preferably of three-layer composition and the central layer consists of microfibre tissue free of binding agent, which is covered on each face with a layer of support fibre tissue free of binding agent. The microfibre tissue may consist of glass fibres, whereas the support fibre tissue may be of nylon fibres as a prefilter. In addition, a filter jacket of filter material, for example foam material, may be situated on the outer support cylinder.

Preferably, the tension rod is screwed in from below into the upper cover or into the filter casing head formed as a cover, passes through the lower cover and carries at its lower end a nut. The upper cover can have passage openings.

The invention is explained in more detail below with reference to an example of embodiment thereof illustrated in the drawing.

DESCRIPTION OF THE PREFERRED EMBODIMENTS

Figure 1:
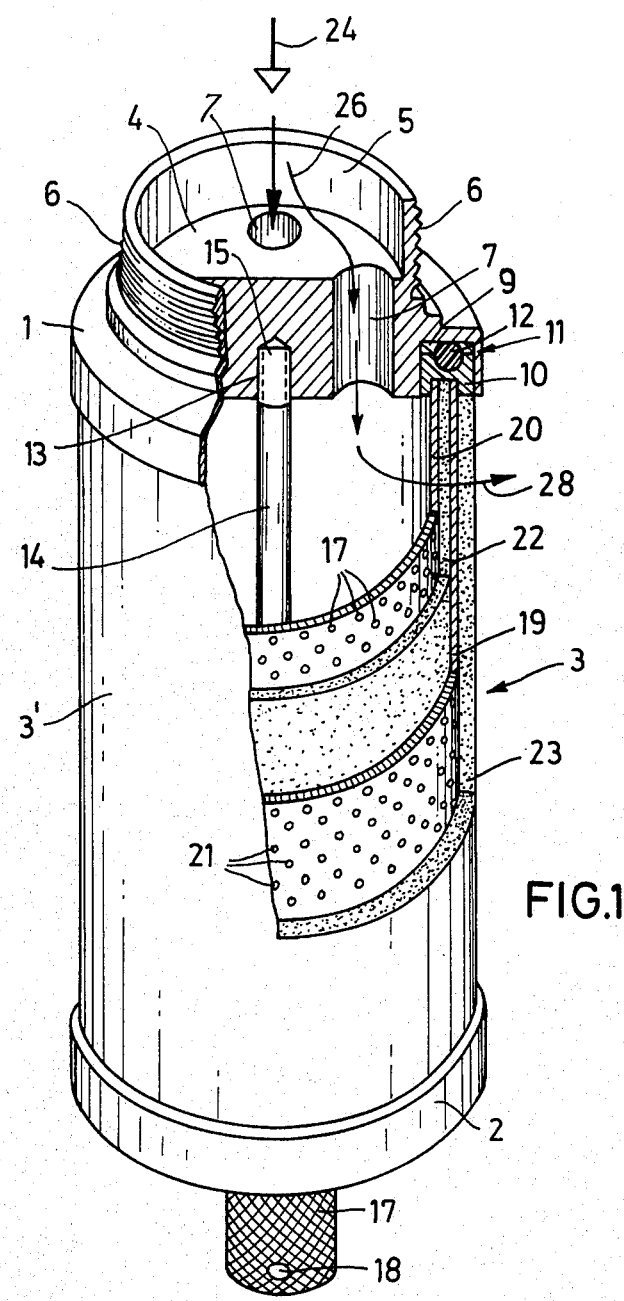
FIG. 1 illustrates a perspective view of a filter element of this invention, partly cut away.
Figure 2:
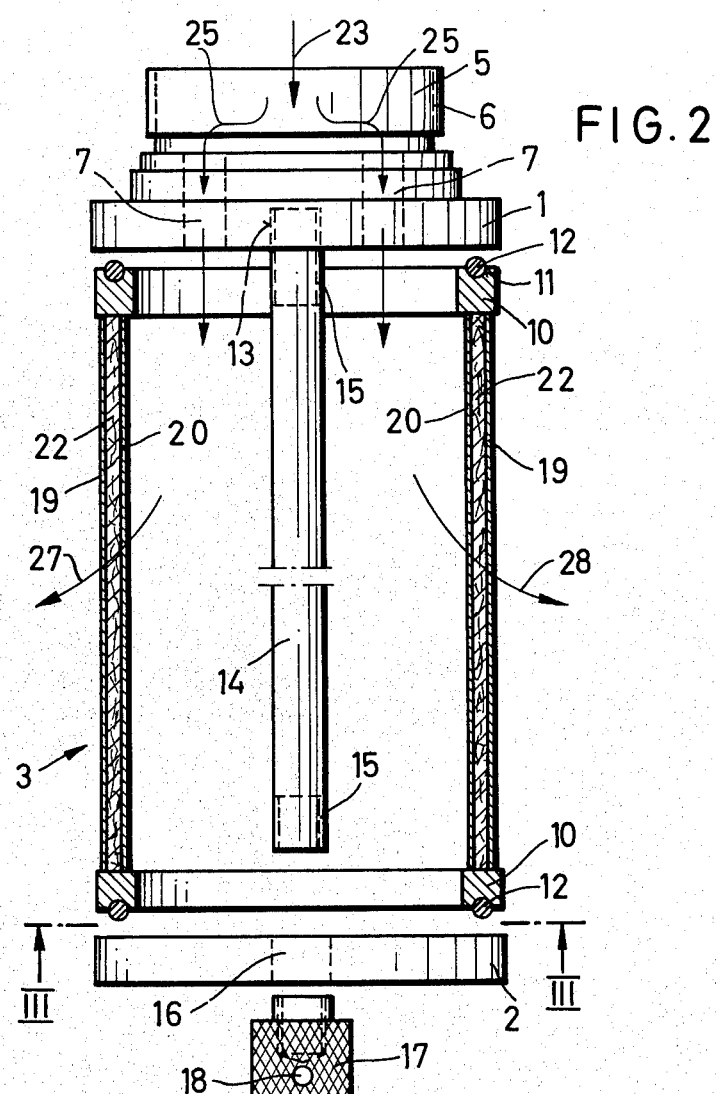
FIG. 2 shows a diagrammatic longitudinal section through the filter element of FIG. 1, but without an external filter jacket.
Figure 3:
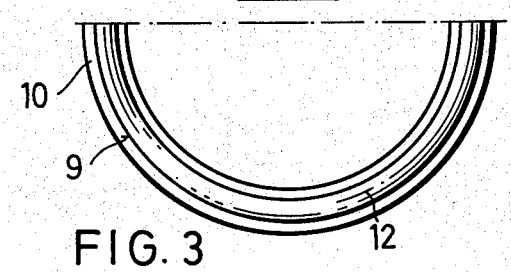
FIG. 3 illustrates a plan view on the filter element along the line III—III of FIG. 2

Between an upper cover 1, which may be an adapter or permanent component of a filter housing, and a lower cover 2, a filter element 3 is situated. The upper cover 1 has a deep-drawn base 4 and a rim 5 surrounding this. The rim 5 is internally smooth and carries, if it is formed as an adapter, a thread 6 on the outside by which the filter element is screwed onto a casing or pipe.

Figure 4:
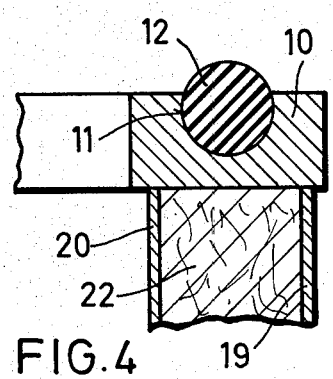
FIG. 4 shows an enlarged section through a portion of the filter element with the sealing ring according to the present invention.

Through openings 7 distributed around a circle are situated in the cover base 4. In the vicinity of its periphery, the upper cover 1 possesses, on its side towards the filter element 3, an annular groove 9 into which the filter tube 3' engages. The filter element 3 has a synthetic resin mass cast onto its upper edge in such a manner that a peripheral synthetic resin ring 10 results, which surrounds the upper edge of the filter tube 3' and in the end face of which a sealing ring 12 is situated in a groove 11. The groove 11 engages around the sealing ring preferably in a claw-like manner (FIG. 4).

The filter tube 3' is connected to the lower cover 2 in the same manner as to the upper cover 1, i.e. the filter element likewise engages with a synthetic resin ring 10 into an annular groove 9.

In the upper cover 1, there is an open-bottomed blind bore 13 with internal thread, into which a tension rod 14 is screwed with its external thread 15. For securely connecting the upper cover 1 to the filter element 3 and to the lower cover 2, the tension rod 14 passes through an opening 16 in the lower cover 2 and comprises a threaded end 15 which is threaded onto a clamping nut 17 having a roughened surface. A bore 18 for tightening up the tension rod 14, by means of a pin, is provided in the clamping nut 17.

The filter tube 3 consists of two coaxial support walls 19, 20 of stainless steel with outlet openings 21. The central layer 22 of the filter medium consists of three layers, not shown individually, that is, two prefilter layers and a main filter layer situated therebetween. On the outer support wall 19 there is seated a filter jacket 23 of filter material or foam material.

During filtering, the medium to be filtered flows in the direction of arrow 24 and branches out in the direction of arrows 25, 26 in order to pass through the inlet bores 7 into the interior of the filter element 3. From here, the medium leaves the space inside the filter element 3 in the direction of arrows 27, 28.

While the foregoing description and drawings represent the preferred embodiments of the present invention, it will be obvious to those skilled in the art that various changes and modifications may be made therein without departing from the true spirit and scope of the present invention.

I claim:

1. In a cartridge filter for gases and liquids having a filter element clamped between an upper and lower cover, the improvement comprising that said filter includes a profile ring composed of a epoxy resin sealing compound cast onto the upper end edge of the filter element and an identical and corresponding profile ring cast onto the lower end edge of the filter element and sealing rings embedded in said profile rings, said profile rings each including one circumferential groove engaging around said sealing rings in a claw-like manner.

2. A filter according to claim 1 wherein the filter element consists of two coaxial support wall cylinders with through openings, between which cylinders a filter medium of a plurality of layers is situated.

3. A filter according to claim 2, wherein the filter medium is of three-layer composition having a middle layer, which is a main filter layer and two prefilter layers positioned on opposite sides of said middle layer.

4. A filter according to claim 2, wherein a filter jacket of filter material is situated on the outer support wall cylinder.

5. A filter according to claim 2, further including a tension rod screwed into the upper cover, and which passes through the lower cover and said rod comprises a threaded portion at its lower end which is secured to a nut.

6. A filter according to claim 1, wherein said upper cover contains through openings.

* * * * *